US007873948B2

(12) United States Patent
Sentovich et al.

(10) Patent No.: US 7,873,948 B2
(45) Date of Patent: Jan. 18, 2011

(54) METHOD AND SYSTEM FOR SPLIT-COMPILING A HYBRID LANGUAGE PROGRAM

(75) Inventors: Ellen M. Sentovich, Oakland, CA (US); Luciano Lavagno, Berkeley, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1333 days.

(21) Appl. No.: 11/360,981

(22) Filed: Feb. 23, 2006

(65) Prior Publication Data

US 2006/0225054 A1    Oct. 5, 2006

Related U.S. Application Data

(63) Continuation of application No. 09/390,141, filed on Sep. 3, 1999, now Pat. No. 7,010,784.

(51) Int. Cl.
G06F 9/45        (2006.01)
(52) U.S. Cl. .................................................... 717/140
(58) Field of Classification Search .................. 717/140
See application file for complete search history.

(56) References Cited

U.S. PATENT DOCUMENTS 5,487,169 A    1/1996  Vraney et al.
5,493,675 A *  2/1996  Faiman et al. ............... 717/151
5,577,253 A * 11/1996  Blickstein ................... 717/156
5,875,334 A    2/1999  Chow et al.
6,021,275 A    2/2000  Horwat
6,233,545 B1 * 5/2001  Datig ............................ 704/2
6,286,134 B1   9/2001  Click et al.

FOREIGN PATENT DOCUMENTS

WO    WO 92/03782    3/1992

OTHER PUBLICATIONS

Dean et al., "Vertex: An Optimizing Compiler for Object-Oriented Languages", Oct. 6-10, 1996, Proceedings of the 1996 ACM SIGPLAN Conference on Object-Oriented Programming Systems, Languages & Applications (OOPSLA '96), San Jose, California, pp. 83-100.*
Boussinot, "Reactive C: An Extension of C to program Reactive Systems", Apr. 1991, Software-Practice and Experience, vol. 21(4), 401-428.*

(Continued)

*Primary Examiner*—Wei Y Zhen
*Assistant Examiner*—Chih-Ching Chow
(74) *Attorney, Agent, or Firm*—Vista IP Law Group LLP

(57) ABSTRACT

A combined language-compiler that provides for the efficient compilation process of hybrid computer code written using a plurality of computer languages by splitting the hybrid code in such a way that each code statement is optimally independently compliable. The designer specifies both computation and communication between different hybrid code modules.

20 Claims, 9 Drawing Sheets

OTHER PUBLICATIONS

Boussinot, F., (1991) "Reactive C: An Extension of C to Program Reactive Systems," *Software-Practice and Experience* 21(4):401-428.

Lavagno, I., et al., (1999) "ECL: A Specification Environment for System-Level Design," *Proceedings 1999 Design Automation Conference* pp. 511-516.

Boussinot, F., et al., "RC Reference Manual," 1991, pp. 1-31.

Narayan, S., et al., "System Specification with the SpecCharts Language," *IEEE Design & Test of Computers*, IEEE Dec. 1992, pp. 6-13.

Harel, D., et al., "Statemate: A Working Environment for the Development of Complex Systems," *IEEE Transactions on Software Engineering* vol. 16, No. 4, Apr. 1990,pp. 403-414.

Stan, L., et al., "An Efficient Implementation of Reactivity for Modeling Hardware in the Scenic Design Environment," *Proceedings of the Design Automation Conference* Jun. 1997, pp. 70-75.

Edwards et al., "Design of embedded systems: formal models, validation, and synthesis," in Proceedings of IEEE, 85(3), pp. 366-390, 1997.

* cited by examiner

Example A.1

*Code Block with Reactivity Inside*

```
module ex1(input int SIGNAL1, input int SIGNAL2)
{
    while (1) {
        await(SIGNAL1);
        code _block1(SIGNAL1);
        await(SIGNAL2);
        code _block2(SIGNAL2);
    }
}
```

FIG. 5

Example A.2 *Code Block with Reactivity only on Interface*

```
static int STATE = 0; int SIG1, SIG2;
if     (present(SIGNAL1)) SIG1 = 1 else SIG1 = 0;
if     (present(SIGNAL2)) SIG2 = 1 else SIG2 = 0;
if     (STATE == 0) {
       STATE = 1;
       return;
}
if     (STATE == 1) {
       if (SIG1) goto LABEL1 else return;
}
if (STATE == 2) {
if (SIG2) goto LABEL2 else return;
}
LABEL1:
       code_block1(SIG1);
       STATE = 2;
       return;
LABEL2:
       code_block2(SIG2);
STATE = 1;
return;
```

FIG. 6

METHOD AND SYSTEM FOR SPLIT-COMPILING A HYBRID LANGUAGE PROGRAM

CROSS REFERENCE TO RELATED APPLICATION

The present application is a continuation of U.S. application Ser. No. 09/390,141, filed Sep. 3, 1999, now U.S. Pat. No. 7,010,784, issued Mar. 7, 2006, priority of which is claimed under 35 U.S.C. §120, the contents of which are incorporated herein by reference as though set forth in full.

BACKGROUND OF THE INVENTION

1. Field of the Invention

The present invention relates generally to the field of software compilation, and more particularly to the field of mixed language software compilation toward software implementation, hardware implementation, or both.

2. Description of the Related Art

In the software programming field, there are numerous programming languages optimized for different purposes. For example, the object-oriented programming languages (OOPLs) are the natural choice for implementation of an Object-Oriented Design because they support the object notions of classes, inheritance, information hiding, and dynamic binding. Currently available OOPLs include C++, Objective C, Smalltalk, Eiffel, Common LISP Object System (CLOS), Object Pascal, Java, and Ada 95.

Object-oriented (OO) applications can be written in either conventional languages or OOPLs, but they are much easier to write in languages especially designed for OO programming. OO languages can be divided into two categories, hybrid languages and pure OO languages. Hybrid languages are based on some non-OO model that has been enhanced with OO concepts. C++ (a superset of non-OO language C), Ada 95, and CLOS (an object-enhanced version of LISP) are hybrid languages. Pure OO languages are based entirely on OO principles; Smalltalk, Java, and Simula are pure OO languages.

Another available computer language type is a distributed programming language that supports Internet-based applications. Several new languages now available, such as Java, Phantom, and Python, attempt to provide Internet- or Web-optimized solutions. All of these languages provide some degree of network support. However, equally important is that all of the distributed programming languages that support Web applications also support general programming tasks, which constitute the bulk of Web-related programming. Distributed programming languages also qualify as object-oriented, since they enable sub-typing, polymorphism, inheritance and dynamic binding.

Also, distributed programming languages are interpreted, which makes them largely platform independent and allows the user to migrate programs and objects more easily from location to location. Phantom, and Python are pure distributed programming languages but can be difficult to compile. Java shares the strengths of the other distributed language, but can be more efficiently compiled. Thus, Java is a hybrid distributed programming language because it is based on a non-Web model that has been enhanced with Web concepts.

Another category of programs are hardware description languages (HDL) that specify design behavior. Some hardware description languages are intended for a particular type of behavior. For example, Esterel is a language designed for control-oriented behavior, while Lustre and Signal are optimized for data-oriented behavior. It should be noted that, while Esterel is an outstanding language for hardware description, it was originally written for pure software applications and continues to be used as such. As with other language types, hardware description languages may be hybridized to enhance functionality.

One candidate for producing a hybrid language for hardware descriptive purposes is the language C. While C alone can be inefficient for pure hardware design work, since the design flow might lack certain key tools and capabilities, C is widely used and the overhead saved in choosing a widely-known language can be considerable.

Thus, in the available art, there are several published languages for specification of system-level mixed hardware/software designs, which are commonly conceived as interacting, concurrent modules. The available art languages provide mechanisms for specifying both the computation of each module and the communication and coordination between them. The available art languages can be summarized as follows.

1. A host language is used for describing the computation of each process and a coordination language is used for describing concurrency and interprocess communication. For reference, please, see "Design of embedded systems: formal models, validation, and synthesis", by S. Edwards, L. Lavagno, E. A. Lee, and A. Sangiovanni-Vincentelli, published in the Proceedings of the IEEE, 85(3), 366-390, March 1997, included herein by reference. A disadvantage of this approach is that the burden of deciding what is coordination and what is computation is left to the user and is fixed, a priori, by the language choice even though the definition is often quite blurred. An advantage is that the compilation algorithms for computation and coordination can be made very efficient.

2. A single language is defined with a single compilation algorithm. A problem with this approach is that it is difficult to best exploit all the potential interplay between concurrency, control and sequencing with a single general-purpose compiler. Traditional software compilation focuses mostly on extracting local parallelism and executing local optimizations, while concurrency compilation focuses mostly on global scheduling.

There is therefore a need in the art for a language, and an associated compiling technique, that combines the advantages of a plurality of existing languages to provide system level designers with a tool powerful enough to support efficient specification of control and data, globally optimized compilation to hardware and software, and that includes semantics and well-developed accompanying compilers and development tool sites familiar enough to the installed base of users to enable rapid, widespread adoption.

SUMMARY OF THE INVENTION

To address the shortcomings of the available art, the present invention provides, a combined language-compiler configured to compile a program comprising a plurality of code statements written using a plurality of computer languages.

A first advantage of the invention is a method of compiling a software program comprising a plurality of code statements using a combined language-compiler, said method comprising the steps of (a) parsing said plurality of code statements into a combined representation of the plurality of code statements; (b) splitting said combined representation into a plurality of sets of code statements, each said set comprising a plurality of independently compilable code statements; (c)

compiling each said set of code statements; and (d) merging each said set of compiled statements into a single executable program.

A further advantage of the present invention is a method of compiling a code comprising a plurality of code statements using said combined language-compiler, the method comprising the steps of (a) parsing said plurality of code statements into a combined representation of the plurality of code statements; (b) splitting said combined representation into a plurality of sets of code statements; (c) using at least two compilers to compile said plurality of sets of code statements; wherein each said set is compilable by one said compiler; and (d) merging each said set of compiled statements into a single executable program. In the alternative, step (a) of parsing said plurality of code statements into said combined representation may further include the step of using at least two computer languages to write said plurality of source code statements.

A still further advantage of the present invention is, in an E/C (Esterel-C) language-compiler, said combined E/C language-compiler comprising an Esterel computer language, a C computer language, an Esterel compiler, and a C compiler, a method of compiling of an E/C source code using said combined E/C compiler, said method comprising the steps of (a) parsing a plurality of statements of said E/C source code; (b) splitting said E/C source code into a plurality of sets of code statements, each said set comprising a plurality of code statements compilable by one said compiler; and (c) compiling each said set of code statements.

Yet another advantage of the present invention is the provision, in a combined E/C (Esterel-C) language-compiler, said combined E/C language-compiler comprising an Esterel computer language, an Esterel compiler, and a C compiler, of a method of compiling of an E/C source code using said combined E/C compiler, said method comprising the steps of (a) parsing said plurality of code statements of said E/C source code into a combined E/C representation of said plurality of code statements; (b) splitting said combined E/C representation into a plurality of sets of E/C code statements; (c) using at least two compilers to compile said plurality of sets of E/C code statements; wherein each said E/C set is compilable by one said compiler; and (d) merging each said set of compiled E/C statements into a single executable program.

Yet another advantage of the present invention is the provision, in a combined language-compiler, of a method of compiling of a hybrid source code using said combined language-compiler, said method comprising the steps of (a) parsing a plurality of statements of said hybrid source code; (b) splitting said hybrid source code into a plurality of sets of code statements, each said set comprising a plurality of code statements compilable by one said compiler; (c) compiling each said set of code statements; and (d) merging each said compiled code statement into a single executable program.

Still another advantage of the present invention is the provision, in a combined language-compiler, of a method of compiling of a hybrid source code using said combined compiler, said method comprising the steps of (a) parsing said plurality of code statements of said hybrid source code into a combined hybrid representation of said plurality of code statements; (b) splitting said combined hybrid representation into a plurality of sets of hybrid code statements; (c) using at least two compilers to compile said plurality of sets of hybrid code statements; wherein each said set is compilable by one said compiler; and (d) merging each said set of compiled statements into a single executable program.

Yet another advantage of the present invention is the provision, of a combined language-compiler comprising (a) a merged syntax defining a plurality of acceptable code statements; (b) a splitter configured to split said combined code into a plurality of sets of code statements; (c) a compiler configured to compile each said set of code statements; and (d) a post-compiler level merger configured to merge each said compiled code statement into a single executable program.

In the alternative, the combined hybrid language-compiler may comprise (a) a syntax of a hybrid language defining a plurality of acceptable code statements; (b) a splitter configured to split said hybrid code into a plurality of sets of code statements, each said set comprising a plurality of code statements, each said code statement compilable independently; (c) a compiler configured to compile each said set of code statements; (d) a checker configured to check whether each said compiled code statement satisfies the semantics of said hybrid language; and (e) a post-compiler level merger configured to merge each said compiled code statement into a single executable program, It should be further understood that any of the aforementioned advantages might be embodied in any computer-usable storage medium.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 5 depicts an {await} statement implementation as an E/C code block having contained reactivity.

FIG. 6 depicts an {await} statement implemented as a block of E/C code with reactivity at its interface.

DETAILED DESCRIPTION OF THE PREFERRED
AND ALTERNATIVE EMBODIMENTS

In a first embodiment of the present invention, the optimization of the execution time and the code and data size of a program written using a hybrid computer language is achieved by utilizing a plurality of compilers acting on a single program. In a preferred embodiment, optimization of the execution time and the code and data size of a program written using a hybrid computer language is achieved by splitting the program into a plurality of independently compilable code statements.

The idea of splitting a program written using a hybrid language into a plurality of independently compilable code statements is illustrated herein using a specific computer language example, ECL, a hybrid of Esterel and C. An Esterel/C hybrid is therefore referred to herein as an E/C hybrid, although any hybrid language might be used without moving away from the scope and content of the present invention.

Figure 1:
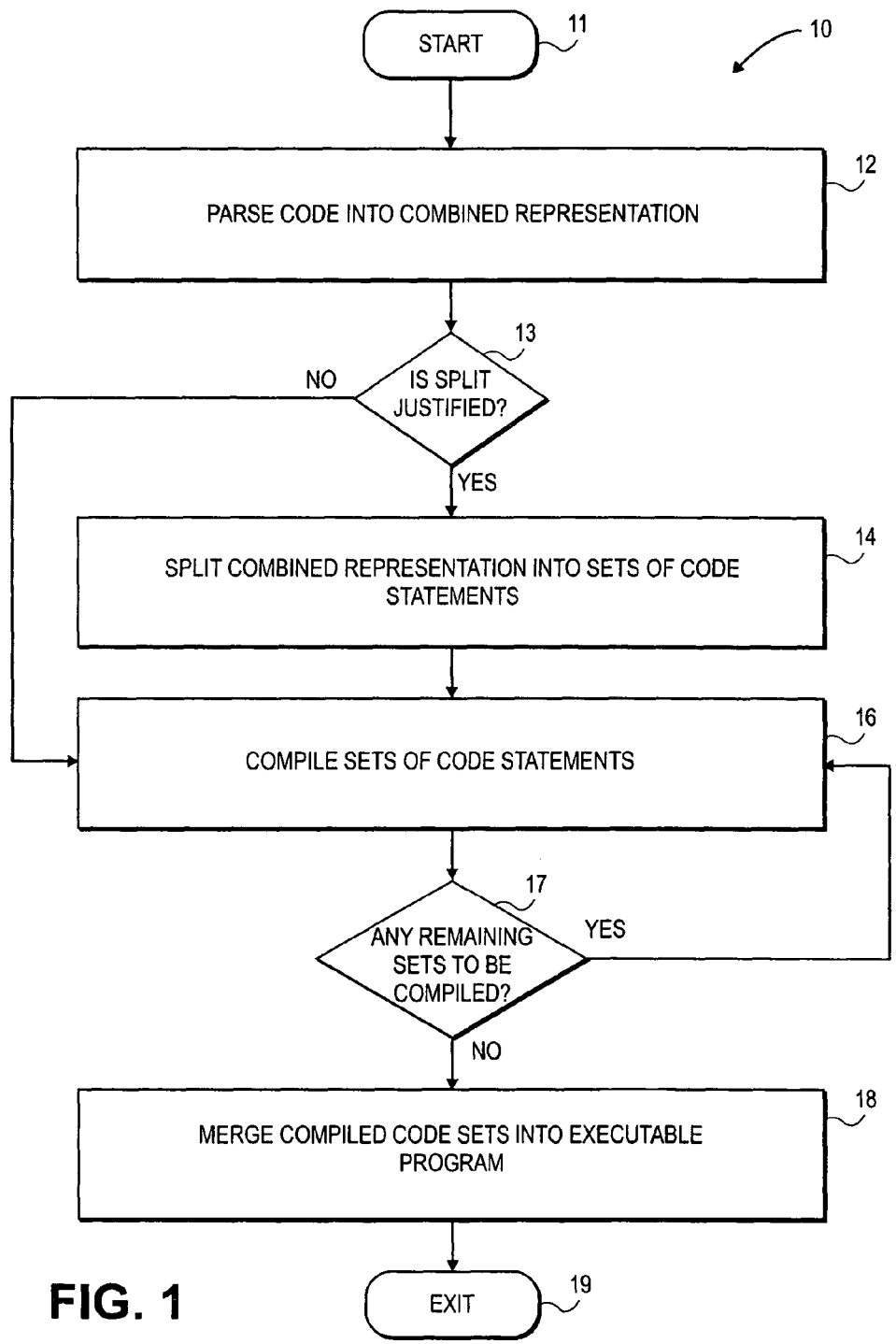
FIG. 1 depicts a flow chart of a method of compiling of the code using the combined language-compiler of the present invention.

FIG. 1 provides a flow chart 10 illustrating a general method of the present invention of compiling code using a combined language-compiler configured to compile a code comprising a plurality of code statements. In one embodiment, each code statement is written using only one computer language. At first step 12, the plurality of code statements written using the plurality of computer languages is parsed into a plurality of statements of a combined code. Generally, the split of the combined code into a plurality of independently compilable code statement sets (at decision point 13) is justified if the split optimizes the execution time and/or the code and data size of the program.

If the split is justified and performed at step 14, each set of code statements is complied independently at step 16. If all code statements have been compiled (at decision point 17), finally, at step 18, each set of compiled statements is merged into a single executable program that is optimized in terms of the run time and/or the code and data size.

Figure 2:
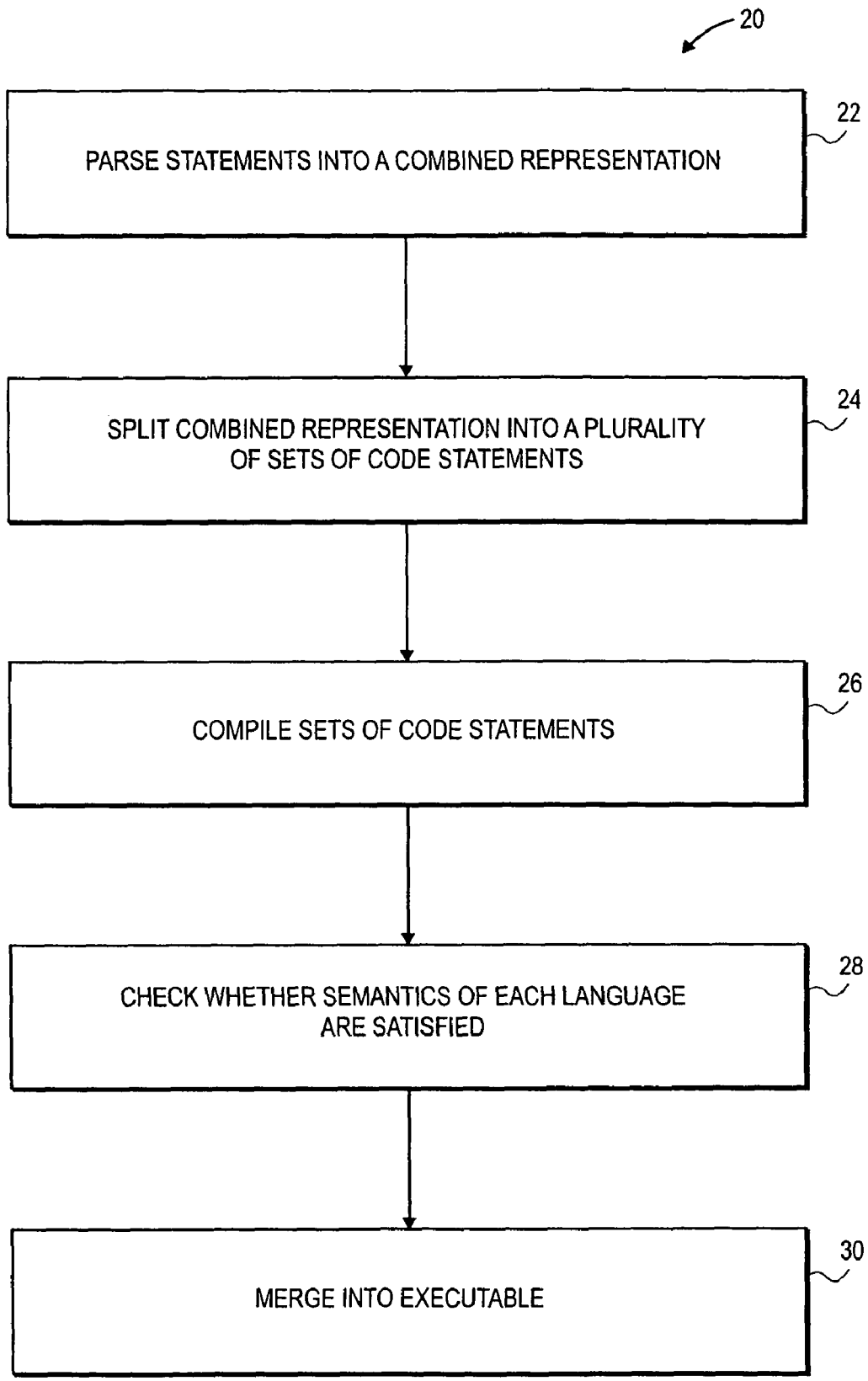
FIG. 2 is a flow chart illustrating a method of splitting a compilation process of a code written using the E/C computer language utilizing the combined E/C language-compiler of the present invention.

FIG. 2 provides a flow chart 20 illustrating the method (10 of FIG. 1) of the present invention as applied to a specific example of code having been written utilizing the combined ECL language and compiled using an Esterel compiler, and a C compiler as an E/C hybrid.

It should be noted that ECL is both a language and a compiler for system level design. The ECL language combines two existing languages, Esterel and C, to provide system level designers with one language.

The C language and its various embodiments are well known in the art. Esterel can be summarized as a language that allows efficient specification of complex control mechanisms. An Esterel compiler first checks that the specification is correct, then transforms it for optimization and analysis to its underlying finite state machine, and finally generates straight line C code for fast execution. The Esterel compilation flow can also be used to create a hardware implementation, as is known in the art. By combining elements of C and Esterel, ECL supports the efficient specification of control and data flow and allows for efficient compilation to both hardware and software. The ECL language is also highly usable because through Esterel and C it includes familiar semantics and is supported by well-developed accompanying compilers and development tool sites. Thus, the ECL language can be defined as a hybrid of C and a plurality of Esterel-style reactive statements. Using an E/C hybrid language such as ECL, the designer can specify both computation (enabled by C) and communication, since Esterel-style reactive statements provide the mechanism for specifying complex communication between different program modules.

In the E/C hybrid language example, several important features of both languages, Esterel and C were blended as follows:

(1) a few keywords and statements for reactivity were added to C from Esterel, thereby preserving a general C "look-and-feel";

(2) the E/C hybrid source code is split into Esterel and C for compilation;

(3) the results of the compilation were recombined preserving both semantics and the ability to perform source-level debugging; and (4) the reactive part of the program was passed to Esterel at the ECL compiler level, so that the complete compilation flow is smooth and intuitive for the designer.

The preferred syntax of an E/C hybrid language is a superset of ANSI C with the addition of a set of reactive statements from Esterel, slightly modified to provide a C style.

Thus, step 22 of FIG. 2, comprising parsing the plurality of statements of the E/C hybrid source code, further includes the step of adding a set of modified Esterel reactive statements into the C language.

The full set of reactive statements from Esterel are preferably modified to be included in the E/C hybrid language as follows:

The Esterel await statement:
await sig;
is replaced with:
await(sig).

The Esterel pausing statement selected from the group consisting of:
{await tick, and pause}
is replaced with:
await( ).

The Esterel emit statement:
emit sig;
is replaced with:
emit(sig).

The Esterel emit with value statement:
emit sig(val);
is replaced with:
emit(sig,val).

The Esterel get value of signal syntax:
?sig
is replaced with:
sig.

The Esterel signal testing statement:
present signal_expression then
    stmt1
    else
    stmt2
is replaced with:
present(signal_expression) stmt1;
    else stmt2;

The Esterel signal operator:
{and}
is replaced with
{&}

The Esterel signal operator:
{or}
is replaced with:
{|}.

The Esterel signal operator:
{not}
is replaced with:
{~}.

The Esterel abortion preemption statement:
abort
    stmt1;
when signal_expression do
    stmt2;
end abort
is replaced with:

--- do stmt1;
abort(signal_expression);
handle stmt2.

The Esterel weak abortion preemption statement:

```
weak abort
    stmt1;
when signal_expression do
    stmt2;
end
``` is replaced with:

```
do stmt1;
weak_abort (signal_expression);
handle stmt2;
```

The Esterel suspension preemption statement:
suspend
stmt;
when signal_expression
is replaced with:

```
do stmt;
suspend(signal_expression);
```

Finally, the Esterel concurrency statement
stmt1||stmt2
is replaced with a member of the group consisting of:

```
{fork
    stmt1;
    stmt2;
join;
and
    par stmt1;
    par stmt2;}.
```

Adding reactive constructs to C creates a language more amenable to system design. Thus, using an E/C hybrid language, one can specify communication of a module with its environment anywhere within a block rather than just at the interface, using the parameters passed into the module as one might do in C. (Examples A.1 and A.2 are provided below).

Thus, in the E/C exemplary embodiment of the present invention, at the first step 22 of FIG. 2, the plurality of E/C code statements is parsed into a combined representation. After parsing, the combined representation should be analyzed before splitting it into a plurality of independently compilable code statements, as shown in step 24 of FIG. 2.

In one embodiment of the present invention (step 14 of FIG. 1), the code written using a hybrid language is split into a plurality of sets of independently compilable code. In the E/C exemplary embodiment of the present patent application, the code splitting, or the separation between a reactive code and a non-reactive code, can be done at several levels; (1) at the user specification level, (2) at the compiler splitting level, or (3) at the final implementation level.

We first address splitting the combined E/C code at the specification level.

In writing a design specification, the designer must choose how to implement the intended behavior. For example, the designer can provide the user with the granularity for exchanging information between two communicating modules. If this is the case, there are numerous possible implementations at the designer's level. In a first implementation, the first module may transfer some data to the second one using one signal with a compound data type containing all the data sent at once. In a second implementation, the information may be split and sent via several signals. Other implementations will be understood by those skilled in the art to which the present invention pertains.

A hybrid language allows the user to perform comparison between these two implementations, which involves modifying the specification of both the internal computations and the inter-module communications. Since the E/C hybrid language supports specification of both computation and communication, and the E/C compiler provides a quick path to an • implementation, the user can quickly assess the quality of these two similar specifications with different levels of reactivity.

In one embodiment of the present invention, the compiling of each set of a hybrid code statements (step 16 of FIG. 1) is separately performed. The code splitting step therefore provides selection of the best compiler for each piece of code.

In one exemplary embodiment of the present invention, the E/C combined language-compiler includes an option for automatic code splitting (step 24 of FIG. 2) of the hybrid code into a reactive part to be compiled by the Esterel compiler, and a non-reactive part to be compiled by a C compiler.

In another exemplary embodiment of the present invention, the E/C hybrid code is split (step 24 of FIG. 2) at the specification level into two different code trial subsets. The first trial subset includes a first plurality of E/C code modules including a first plurality of internal module computations, a first plurality of inter-module communications, and a first level of reactivity. The second trial subset includes a second plurality of E/C code modules including a second plurality of internal module computations, a second plurality of inter-module communications, and a second level of reactivity.

After comparing the first trial E/C code with the second trial E/C code and assessing the differences in compilation time and in execution time between the two trial E/C codes, the designer can select an optimum trial E/C code. Thus, at the specification level, the separation is not defined a priori, but can be modified later, in a manual or automated "meta-optimization" loop.

This approach may be generalized to multiple compilers in different domains acting on a general hybrid code, as depicted in step 14 of FIG. 1.

In one more exemplary embodiment, code splitting (step 24 of FIG. 2) takes place at the compilation level. In this embodiment, the E/C compiler splits the E/C language into an Esterel part and a C part according to the capabilities of each compiler, and thus provides efficient paths to final implementations in hardware and software. The E/C compiler thereby splits, or otherwise separates, the reactive and non-reactive parts of the E/C code.

Figure 3:
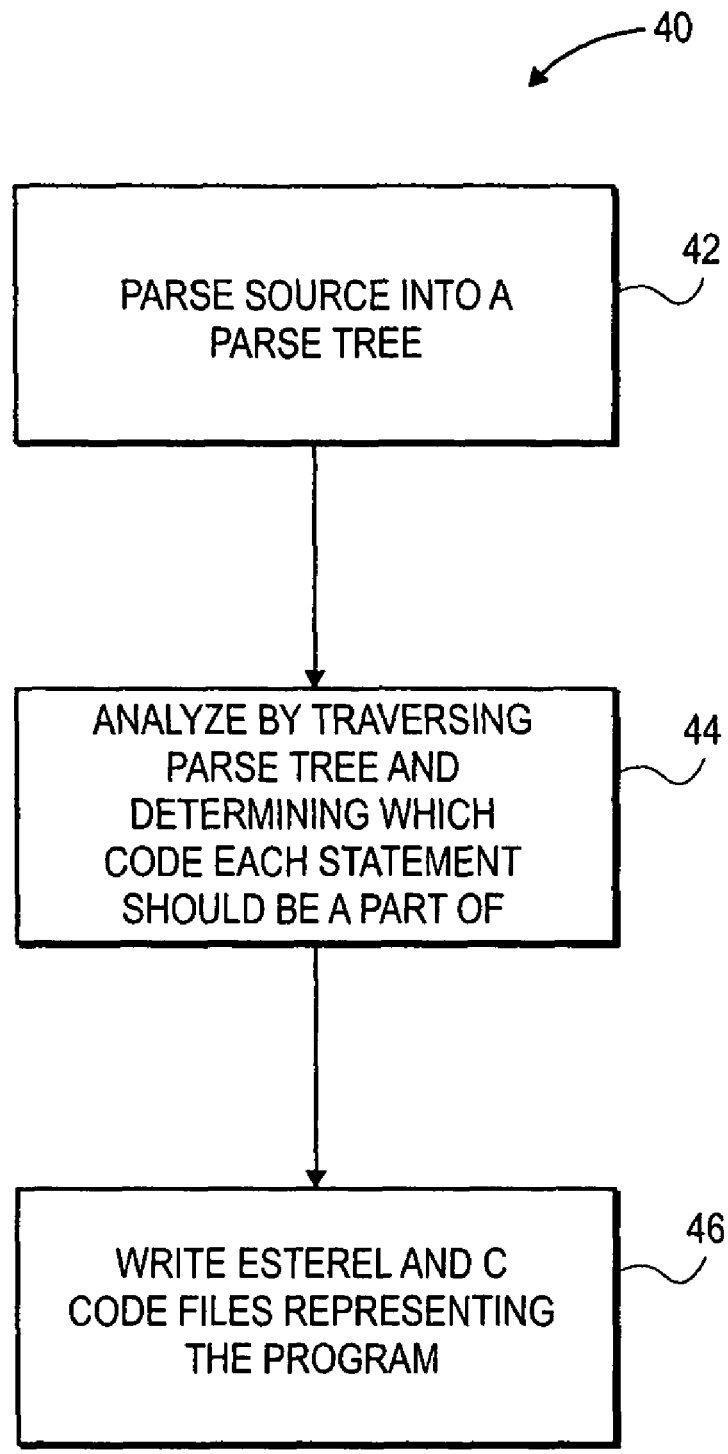
FIG. 3 shows three tasks performed by the E/C compiler of the present invention.

As depicted in FIG. 3, the hybrid compiler performs three tasks 40. At first step 42, the E/C compiler parses the E/C source creating a parse tree (a combined representation) containing the program. Next, the E/C compiler analyzes the program (step 44) by traversing the parse tree, and determining for each statement whether it should be part of the Esterel code or the C code. Finally, (at step 46), the E/C compiler creates the Esterel and C code files representing the program.

Initially, the E/C code statements can be placed into three categories:

(a) E/C reactive code statements, which go to the Esterel file;

(b) E/C non-reactive (for instance, data field access) code statements, which go to the C file;

(c) E/C code statements that require more than local analysis to determine whether they are forced to go into the Esterel file or C file, or whether the compiler can choose, based on, for example, the desire to optimize certain parameters.

Therefore, all of the reactive statements, such as {signal waiting, signal emission, signal testing, preemption, and concurrency}, that are added to C to create the E/C hybrid (as described above) are automatically placed in the Esterel file.

There are five sets of reactive statements added to C to create the E/C hybrid language. The first set includes the signal waiting reactive statements: {await( ); await(sig exp); await(immediate(sig exp))}. The signal emission reactive statements: {emit(signal); emit(signal, value)} are included in the second set. The third set comprises the signal testing reactive statements {present(sig exp); present(sig exp) else.}. The preemption reactive statements {do abort(sig exp); do abort(sig exp) handle; do weak abort(sig exp); do weak abort (sig exp) handle; do suspend(sig exp); do suspend(sig exp) handle;) are included into the fourth set. Finally, the fifth set includes the concurrency reactive statements: {par stmt1; par stmt2;}.

There are some C statements that cannot be handled by Esterel, since Esterel supports only simple data types such as integer, boolean, and real. Thus, all constructs defining and manipulating data types, like {type definition, field access, and pointer access}, should be placed in the C code file.

Figure 4:
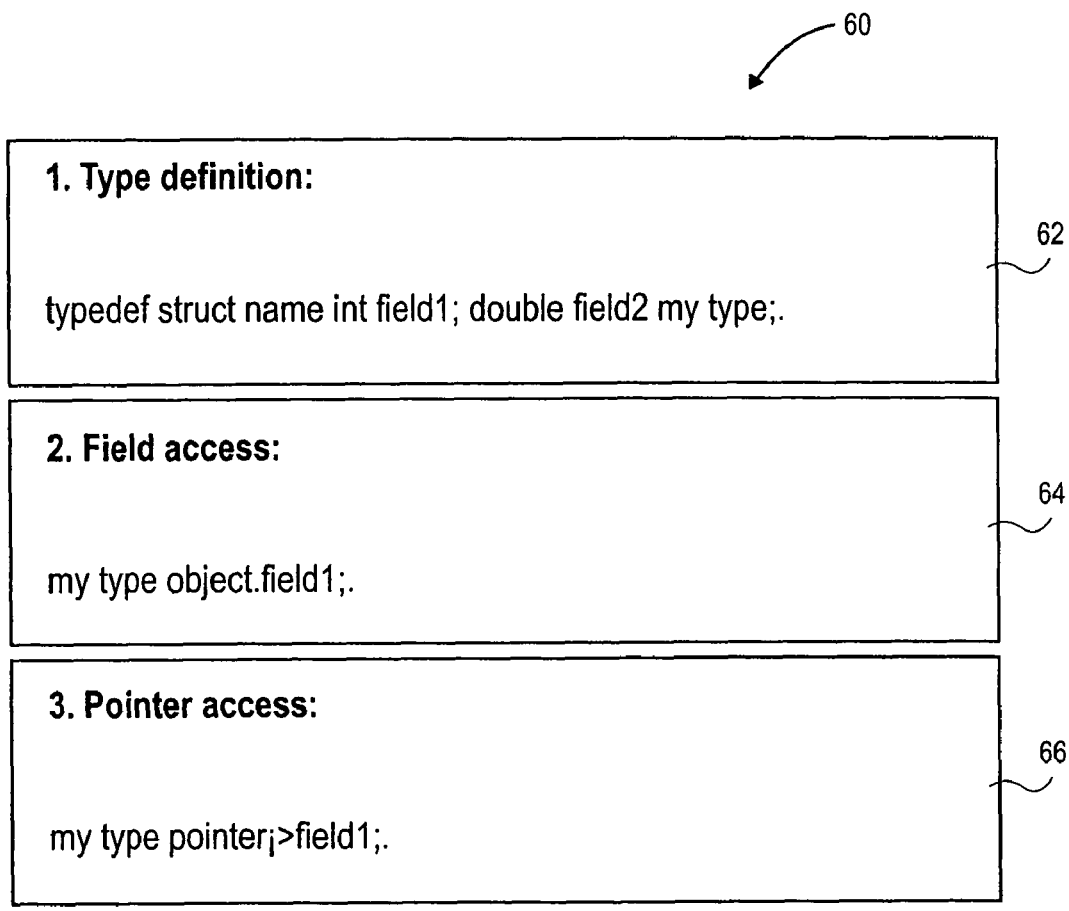
FIG. 4 depicts the code statements tagged by the E/C compiler for the C code portion.

FIG. 4 depicts code statements 60 tagged by the E/C compiler for the C code portion. The type definition statements: {typedef struct name int field1; double field2 my type;} are depicted in block 62. The field access statements: {my type object.field1;} are listed in block 64. The pointer access statements: {my type pointer->field1;} are shown in block 66.

In addition, since the control flow in Esterel is entirely determined by the Esterel syntax and the signal communication, Esterel cannot handle explicit-goto-statements. Thus, -goto-statements are written by the E/C compiler into the C code file.

Both Esterel and C include looping constructs. Since the Esterel compiler does a static analysis of a program to ensure that it terminates at each reaction with a deterministic response, all Esterel loops must include a halting statement (such as await). This guarantees a finite reaction at each execution. On the other hand, C has no notion of halting, so it cannot handle such statements. As a result, the E/C compiler places all loops with halting statements in the Esterel code file, and all loops without halting statements in the C code file.

Both Esterel and C have the-if ( ) then else-construct. In E/C, if signal names appear in the conditional part of the-if-, it is assumed this refers to the signal values rather than their presence/absence status. Thus, the E/C, Esterel, and C versions of-if ( ) then else-are all similar. To distinguish between them during splitting, the E/C compiler analyzes the reactive statements contained in the-then-and-else-parts. If there are any reactive statements in either part, the entire-if-statement should be written to the Esterel file, otherwise it may be written to either the Esterel file or the C file. If there is a choice, the code surrounding the-if-statement can he a factor. For example, if the code surrounding the-if-statement is preceded by Esterel-bound code, the-if-statement is also placed in the Esterel code to keep the largest blocks of statements as close to each other as possible.

Referring hack to FIG. 2, in the E/C exemplary embodiment of the present invention, the step (4) of code splitting can be made based on the final implementation model. In this embodiment, information about the subsequent implementation of a specification gives an additional layer of flexibility to the splitting process. In this embodiment, the reactive statements may he implemented directly for the target system.

The-await-statement is a good example of how the splitting process can be optimized based on the anticipated implementation choices in the system-level design environment. Indeed, the-await-statement intuitively halts execution of a block of code until the awaited signal arrives. This is illustrated by Example A.1 depicted in block 110 of FIG. 5. Block 110 is an E/C code sample and could include the complete description of the compilation itself. It is assumed that this block is a part of a larger system which calls the block to run each time the block has a new input. When the block runs, it begins executing where it left off at its previous run, and returns control to the larger system whenever the block reaches an-await-statement. In this code fragment, one repeatedly waits for the arrival of SIGNAL1, executes-code_block1-, waits for the arrival of SIGNAL2, and executes-code_block2-.

The reactivity of this block to external stimulus is expressed by the await-statements internal to the block. The Esterel compiler would transform this piece of reactive code into a piece of straight-line code that is always executed from top to bottom, that returns in the end, and that contains states which keep track of which signals are being awaited at any given time.

FIG. 6 depicts another Example A.2 in the block of code 120 of FIG. 6 with reactivity on the interface. Again, this is the E/C code for an entire block 120 which is part of a larger system that calls block 120 whenever the block has new inputs. The behavior of block 120 is equivalent to the behavior of block 110. Block 120 begins executing at the beginning of the block every time it is called to compute, and returns control to the system when it reaches a-return-statement. In this case, the reactivity is shifted from the interior of the module with an-await-statement to its interface, with signal reading done at the beginning, and with an explicit-return-in the body. E/C code block 120 is similar to what the Esterel compiler would in fact produce for Example A.1 of FIG. 5.

In another embodiment, the-await-instruction can be supported directly in the implementation of the system, instead of by compiling it away to the interface. For example, the designer uses a system-level design tool which models a system as a network of reacting modules. In the software implementation, wherein modules are mapped to the same CPU, the signal exchange (or information passing) between the modules is implemented by reading and writing buffers.

A Real Time Operating System ("RTOS") can be used to control the interaction between the reading and writing the buffers, and calling the various modules to run. A module may be run by the RTOS whenever it has new information on its input buffers. A module, upon completing the execution, may supply information to the RTOS about precisely which signals it is waiting for to perform its next reaction. If this is the case, the E/C statement-await(SIGNAL1)-can be implemented directly at the system-level by the RTOS. That is, the E/C code shown in the Example A.1 of FIG. 5 would be precisely the C code run on the target system. When the module executes the-await-statement, control is directly returned to the RTOS (instead of using a return statement) with the information that it should not be called until the signal SIGNAL1 has arrived. In addition, the RTOS saves the stack of the executing block to ensure that its subsequent execution continues precisely (in space and time) where the previous one left off. The above example illustrates how the-await-statement can be implemented directly by a C compiler targeting a system-level design environment.

In the exemplary E/C hybrid language embodiment of the present invention, the reactive statement is reclassified from being strictly compilable to one compiler (Esterel), to being compilable by either an Esterel compiler or a C compiler, since the subsequent implementation is substantially flexible to process reactive statements. More complex reactive statements can be similarly implemented.

Thus, in one exemplary embodiment of the present invention, step 24 (of FIG. 2) splitting the E/C code further includes the step of reclassifying a reactive statement compilable by either the Esterel compiler or by the C compiler if the implementation method is substantially robust and provides sufficient options to process the reactive statement.

There is a tradeoff between these two styles of implementation. The Esterel-compiled code is able to handle more complex reactive code statements (for example, the-preemption statement) and generates highly optimized code, but the code size may extend significantly in its intermediate or final form. On the other hand, the C-compiled code implies a more predictable compilation path (no code-size blowup), but may result in a much slower implementation.

Referring back to FIG. 2, after compiling each E/C code statement (step 26 of FIG. 2) by using one of the above-given approaches, and after checking whether each set of code statements satisfies the semantics of each language, C and Esterel (step 28), each compiled code statement is merged (step 30) into a single E/C executable program.

In one embodiment of the present invention, after the compilation step is completed (step 16 of FIG. 1), the next step is the step (18 of FIG. 1) of merging each set of the compiled statements into a single executable program.

In the exemplary E/C hybrid language embodiment of the present invention, each set of compiled code statements (step 18 of FIG. 1) is merged into a single executable program.

The goal of the merging process is to obtain a compiled implementation of the complete !VC specification by exploiting the capabilities of the Esterel and C compilers at their best. After the code is split and the compilation is performed, the main body of the module is controlled by its reactive part. As explained above, the reactive part of the E/C code is implemented in the code produced by the Esterel compiler, which happens to be C-code, and is referred to herein as the E-compiled code.

In one embodiment, the C code-is merged (step 30 of FIG. 2) into the E-compiled code by calling a procedure from the E-compiled code, wherein the procedure call is generated by the E/C compiler when it writes the Esterel code.

In another embodiment, the procedure call from the E-compiled code is implemented as a macro in C. In one additional embodiment, the procedure call from the E-compiled code is implemented by passing variables by reference to the procedure. As an example, let us assume that the E/C code includes the following code fragment:

await (a);

for (i 0; i<a; i++) j+=i;

This code fragment would be translated into the following Esterel fragment (written by the E/C compiler to the Esterel file):

procedure extracted_loop(integer,integer)( );

. . .

await(a);

call extracted_loop(i,a);} and the accompanying C code (written by the E/C compiler to the C file) would be:

define extracted_loop(i,a) for (i=0; i<a; i++) j+=i;

This mechanism works because the E-compiled code, that is the code produced by the Esterel compiler is, in fact, C, so it can be processed together with the extracted macros.

In the exemplary E/C hybrid language embodiment of the present invention, debugging E/C code can be done by using available general-purpose debuggers developed for C. This task is made easier by the similarity of E/C and C syntax. In fact, all one has to provide is a mechanism for the C debugger to access (a) source code line, and (b) variable names and types, both for Esterel-generated C code and for extracted C macros. Thus, in the debug mode, the E/C compiler attaches to each extracted Esterel or C statement a call to a function that represents its source code line. This function is implemented in a C file that contains the appropriate source-code references (via C #line directives). Thus, whenever the user sets a breakpoint on a source line, the debugger finds the corresponding function via the #line directive and then sets a breakpoint on its code instead. The function is called, due to its position in the Esterel and C code, exactly when the corresponding statement is executed, and thus achieves the desired result.

Referring again to FIG. 2, we next examine step 28, checking whether each compiled code statement satisfies the semantics of each language. In one embodiment, step 28 further includes the steps of using the Esterel compiler to find and analyze causality problems, and to report any such problems to the user at the E/C level. In another embodiment, the step of using the Esterel compiler to find and analyze the causality problem further includes the step of checking by the Esterel compiler whether a set of reactive code statements includes a finite state machine equivalent that can be analyzed statically. To this end, the Esterel compiler first checks the specification to be sure that it has a finite state machine equivalent that can be analyzed statically.

Since the E/C compilation process splits code to an Esterel and a C part, the Esterel part will subsequently be subject to such a causality analysis. Since the analysis should be conservative to ensure the implement ability of a program, it is occasionally too strict for the E/C user. For example, variable sharing is strictly controlled in Esterel programs, since the control path may depend on variable values, and static analysis of an Esterel program requires complete knowledge of the behavior of the control path. To illustrate this point, we will review the following block of E/C code:

```
while (1) {
    par await(DATA1); write_data(buffer, DATA1); emit GOT1; }
    par { await(DATA2); write_data(buffer, DATA2); emit GOT2; }
}
```

The function of this block is to wait, concurrently, for two chunks of data DATA1 and DATA2, and to store their values in the local buffer by using the write_data procedure. In the concurrent statements, it looks to Esterel as though the buffer is being simultaneously written by both branches of the concurrency. Since any variable that is simultaneously being written by two writers may lead to a non-deterministic result, Esterel has to reject this code as being non-causal.

Now suppose, for example, that the data types used for DATA1 and DATA2 contain information about where in the buffer to store the corresponding data, and the two locations are, in fact, different. This implies deterministic behavior that Esterel cannot recognize as such. If this is the case, the buffer is written by two pieces of code "simultaneously" and it looks to Esterel as though the buffer is being doubly written, while in fact different parts of it are being written at the same time. Again, since any variable that is simultaneously being written by two writers may lead to a non-deterministic result, Esterel has to reject this code as being non-causal.

The preferred E/C hybrid compiler is designed to easily hide such apparent over-writing from the Esterel compiler. This is done by calling procedures from the Esterel code, which appear to read only all the variable parameters rather than to write any of them. Since these procedures are implemented as macros in C, the macros are free to actually write the variables as necessary. This removes any possibility of detecting the causality problem, by shutting off the Esterel error message In one embodiment, the result of the causality analysis is anticipated in order to report a possible causality problem to the user at the E/C level. If some causality problems are anticipated at the E/C level, they can be fixed much faster.

Figure 7:
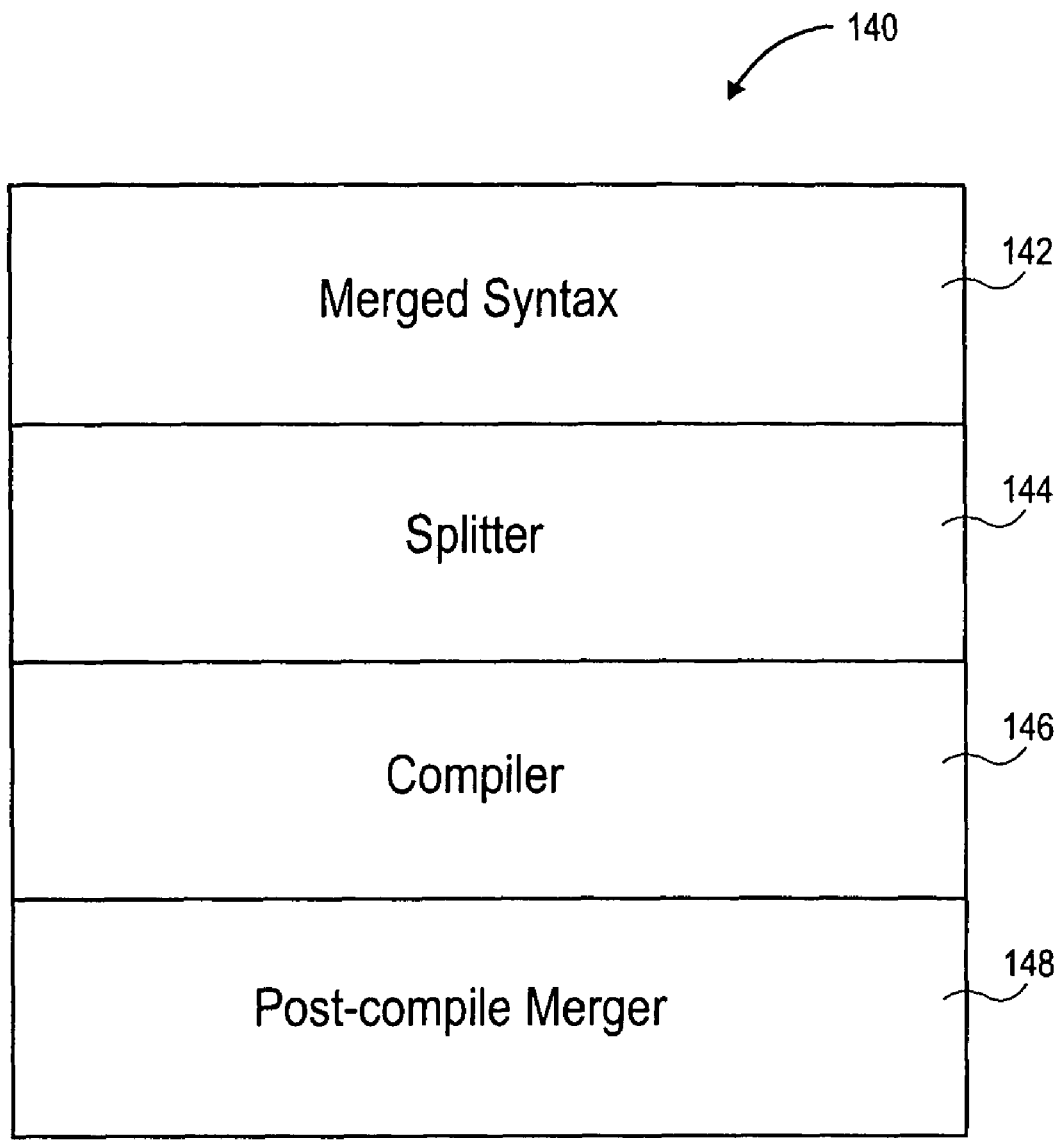
FIG. 7 depicts a combined language-compiler.

In one embodiment, the present invention includes a combined language-compiler as a special purpose computer program 140 including a number of elements, as shown in FIG. 7. A merged syntax 142 defines a plurality of acceptable code statements written using a plurality of computer languages. In one embodiment, the plurality of computer languages is selected from the group consisting of: {C, and Esterel}.

A splitter 144 is configured to split the combined code generated by the merged syntax (142) into a plurality of sets of code statements, wherein each set comprises a plurality of independently compilable code statements. Each set of code statements is configured to be compiled by a compiler 146. In one embodiment, each code statement is configured to be compiled by a compiler selected from the group consisting of: (C compiler, and Esterel compiler}. Finally, a post-compiler level merger 148 is configured to merge each compiled code statement into a single executable program.

Figure 8:
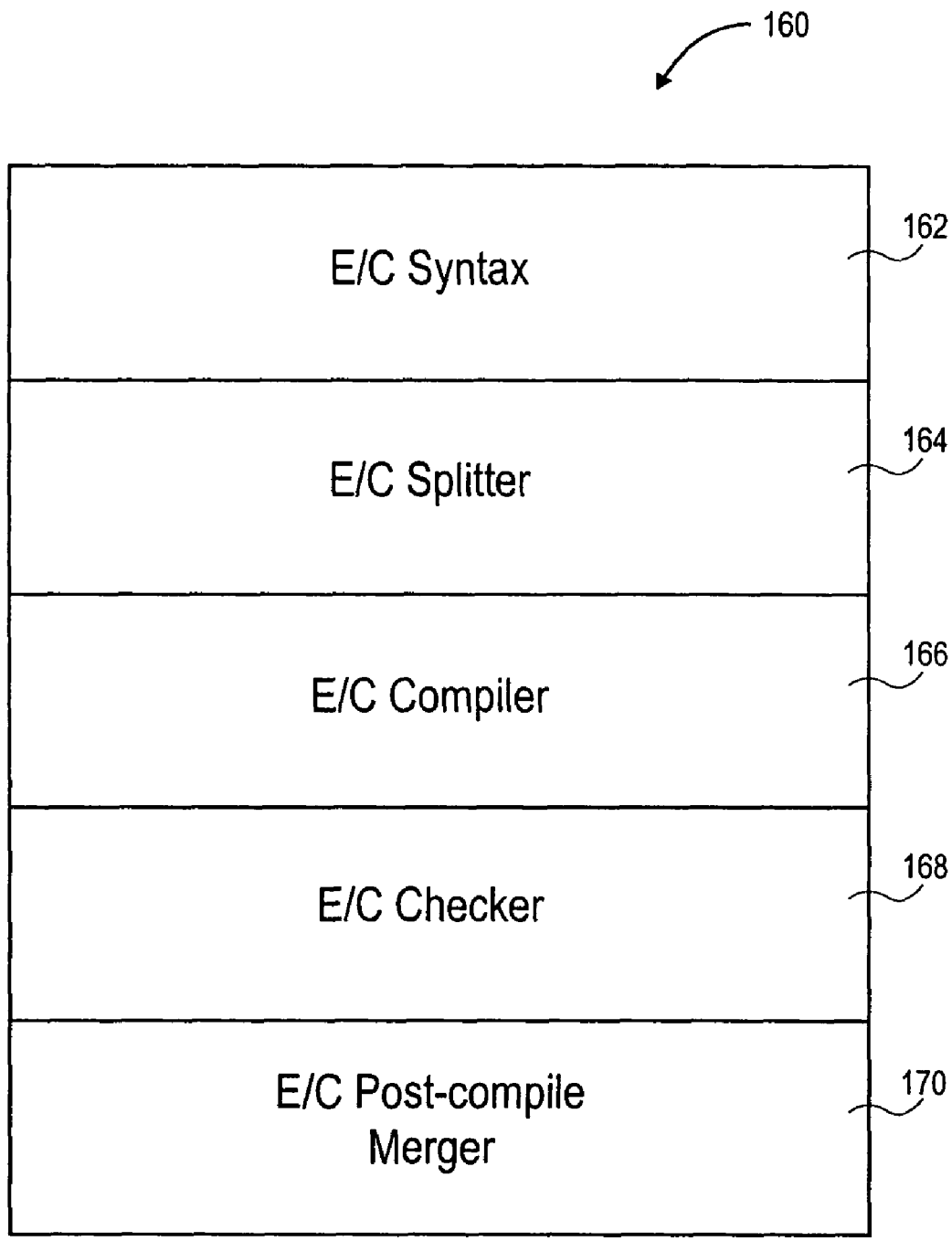
FIG. 8 illustrates a combined Esterel-C language-compiler.

In another embodiment of the present invention, as depicted in FIG. 8, a combined (E/C) language-compiler 160 is implemented as a specific purpose computer, including an E/C syntax 162, an E/C splitter 164, an E/C compiler 166, an E/C checker 168, and an F/C post-compiler merger 170.

E/C syntax 162 of the E/C language defines a plurality of acceptable code statements in an E/C source code, wherein each code statement is written using a C computer language or an Esterel computer language. The E/C splitter 164 is configured to split the E/C code into a plurality of sets of code statements, wherein each set comprises a plurality of independently compilable code statements.

E/C compiler 166 is configured to compile each set of code statements, and E/C checker 168 is configured to check whether each compiled code statement satisfies the semantics of the Esterel and C languages. Finally, the E/C post-compiler level merger 170 is configured to merge each compiled code statement into a single E/C executable program.

In one embodiment of the present invention, the computer-readable storage medium includes the computer-readable code instructions configured to cause the combined language-compiler (140 of FIG. 7) to execute steps 14-18 of FIG. 1.

In another embodiment of the present invention, a computer-readable code is embedded in a storage medium. This code is manipulated by a combined language-compiler (140 of FIG. 7) that is configured to execute steps 14-18 of FIG. 1.

In one more embodiment of the present invention, the computer-readable storage medium includes the computer-readable code instructions configured to cause the combined E/C language-compiler (160 of FIG. 8) to execute steps 22-30 of FIG. 2.

In still another embodiment of the present invention, a computer-readable E/C code is embedded in a storage medium. This E/C code is manipulated by the combined E/C language-compiler (160 of FIG. 8) that is configured to execute steps 24-30 of FIG. 2.

Figure 9:
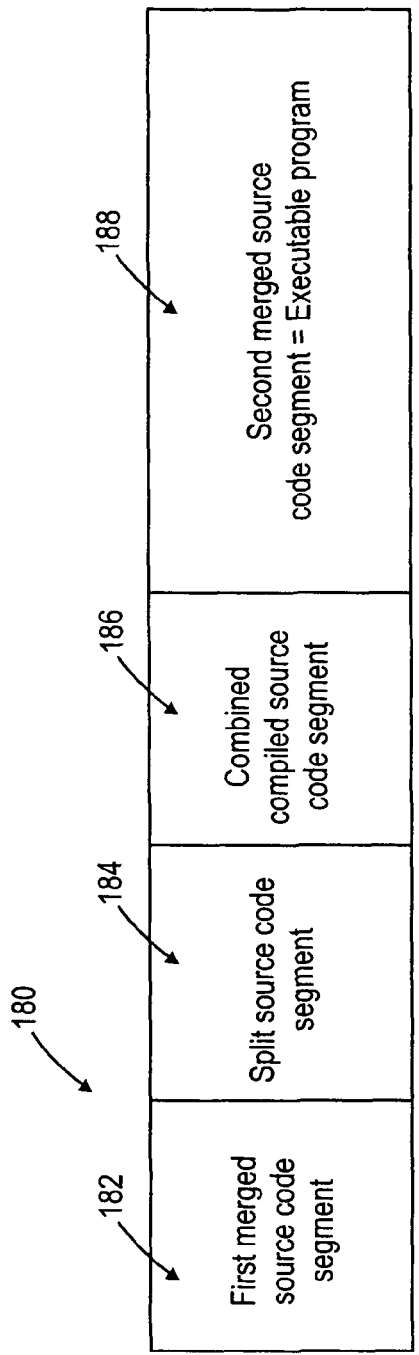
FIG. 9 shows a computer data signal embodied in a carrier wave.

In yet another embodiment of the present invention, a computer data signal is embodied in a carrier wave 180, as depicted in FIG. 9. In one embodiment, the carrier wave (180) comprises a first merged source code segment 182, a split source code segment 184, a combined compiled source code segment 186, and a second merged source code segment 188 comprising a plurality of compiled code statements as a single executable program.

Figure 10:
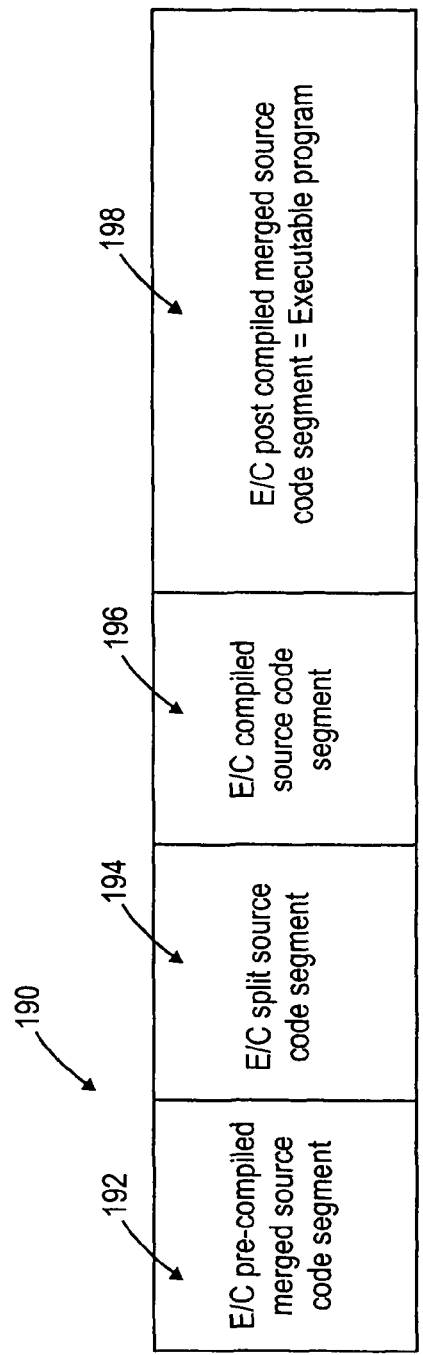
FIG. 10 depicts an E/C computer data signal embodied in an E/C carrier wave.

In another embodiment of the present invention, an E/C computer data signal is embodied in an E/C carrier wave (190 of FIG. 10). The E/C carrier wave 190 comprises an E/C pre-compiler merged source code segment 192, a split E/C source code segment 194, an E/C combined compiled source code segment 196, and an E/C post-compiler-merged source code segment 198 comprising a plurality of E/C compiled code statements as a single E/C executable.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. In a combined language-compiler product for a computer system having a processor, a method of compiling a combined code comprising a plurality of code statements using said combined language-compiler product, said method comprising:

using the processor for:
parsing said plurality of code statements into a combined representation of said plurality of code statements, wherein said plurality of code statements comprises reactive code statements and non-reactive code statements such that a designer can specify computation with the non-reactive code statements and communication between different program modules with the reactive code statements;
splitting said combined representation into a plurality of sets of code statements, at least one of said plurality of sets of code statements comprising a plurality of independently compilable code statements, wherein the reactive code statements and non-reactive code statements are split at a user specification level, a compiler splitting level or an implementation level;
compiling said at least one of said plurality of sets of code statements; and
merging said at least one of said plurality of sets of compiled statements with one or more other sets of compiled statements into a single executable program; and
storing the code in a storage medium.

2. The method of claim 1, further comprising:
using the processor for checking whether said plurality of sets of code statements satisfies the semantics of a language of the combined language-compiler product.

3. In a combined language-compiler product for a computer system having a processor, a method of compiling a combined code comprising a plurality of code statements using said combined language-compiler product, wherein said combined language-compiler product comprises at least two compilers, said method comprising:

using the processor for:
parsing said plurality of code statements into a combined representation of said plurality of code statements, wherein said plurality of code statements comprises reactive code statements and non-reactive code statements such that a designer can specify computation with the non-reactive code statements and communication between different program modules with the reactive code statements;

splitting said combined code into a plurality of sets of code statements, wherein the reactive code statements and non-reactive code statements are split at a user specification level, a compiler splitting level or an implementation level;

using said at least two compilers to compile said plurality of sets of code statements; wherein at least one of said plurality of sets is compilable by one of said at least two compilers; and merging said at least one of said plurality of sets of compiled statements with one or more other sets of compiled statements into a single executable program; and storing the code in a storage medium.

4. The method of claim 3, further comprising:

using the processor for checking whether said plurality of sets of code statements satisfies the semantics of a language of the combined language-compiler product.

5. In a combined language-compiler product for a computer system having a processor, a method of compiling of a hybrid source code using said combined language-compiler product, said method comprising:

using the processor for:

parsing a plurality of statements of said hybrid source code, wherein said plurality of statements comprises reactive code statements and non-reactive code statements such that a designer can specify computation with the non-reactive code statements and communication between different program modules with the reactive code statements;

splitting said hybrid source code into a plurality of sets of code statements, at least one of said plurality of sets of code statements comprising a plurality of code statements compilable by said combined language-compiler, wherein the reactive code statements and non-reactive code statements are split at a user specification level, a compiler splitting level or an implementation level;

compiling said at least one of said plurality of sets of code statements; and merging said compiled code statement with one or more other compiled code statements into a single executable program; and storing the code in a storage medium.

6. The method of claim 5, further comprising:

using the processor for checking whether said plurality of sets of code statements satisfies the semantics of a language of the combined language-compiler product.

7. In a combined language-compiler product for a computer system having a processor, a method of compiling of a hybrid source code using said combined language-compiler product, wherein said combined language-compiler product comprises at least two compilers, said method comprising:

using the processor for:

parsing said plurality of code statements of said hybrid source code into a combined representation, wherein said plurality of code statements comprises reactive code statements and non-reactive code statements such that a designer can specify computation with the non-reactive code statements and communication between different program modules with the reactive code statements;

splitting said combined representation into a plurality of sets of hybrid code statements, wherein the reactive code statements and non-reactive code statements are split at a user specification level, a compiler splitting level or an implementation level;

using said at least two compilers to compile said plurality of sets of hybrid code statements; wherein at least one of said plurality of sets of hybrid code statements is compilable by one said compiler; and merging said at least one of said plurality of sets of compiled statements with one or more other compiled statements into a single executable program: and storing the code in a storage medium.

8. The method of claim 7, further comprising:

using the processor for checking whether said plurality of sets of hybrid code statements satisfies the semantics of a language of the combined language-compiler product.

9. A combined language-compiler product to compile a combined code for a computer system, comprising:

a specific purpose computer having a processor implemented with:

a merged syntax defining a plurality of acceptable code statements, wherein said plurality of acceptable code statements comprises reactive code statements and non-reactive code statements such that a designer can specify computation with the non-reactive code statements and communication between different program modules with the reactive code statements;

a splitter configured to split said combined code into a plurality of sets of code statements, wherein the reactive code statements and non-reactive code statements are split at a user specification level, a compiler splitting level or an implementation level;

a compiler configured to compile at least one of said plurality of sets of code statements; and a post-compiler level merger configured to merge at least one of said compiled code statements with one or more other compiled code statements into a single executable program.

10. The combined language-compiler product of claim 9, wherein the compiler is further configured with a checker to check whether the at least one of said plurality of sets of code statements satisfies the semantics of a language of the compiler.

11. A combined hybrid language product to compile a hybrid code for a computer system, comprising:

a specific purpose computer having a processor implemented with:

a syntax of a hybrid language defining a plurality of acceptable code statements, wherein said plurality of acceptable code statements comprises reactive code statements and non-reactive code statements such that a designer can specify computation with the non-reactive code statements and communication between different program modules with the reactive code statements;

a splitter configured to split said hybrid code into a plurality of sets of code statements, a set comprising a plurality of code statements, at least one of said code statements compilable independently, wherein the reactive code statements and non-reactive code statements are split at a user specification level, a compiler splitting level or an implementation level;

a compiler configured to compile said set of code statements;

a checker configured to check whether each a compiled code statement satisfies the semantics of said hybrid language; and a post-compiler level merger configured to merge said compiled code statement with other compiled code statement into a single executable program.

12. The combined hybrid language product of claim 11, wherein the compiler is further configured to find and analyze the causality of semantic problem.

13. A computer-usable apparatus useful in association with a combined language-compiler, said combined language-compiler configured to compile a plurality of combined code statements; said computer-usable apparatus including computer-readable code instructions configured to cause said combined language-compiler to execute a process using a processor, the process comprising:

using the processor for:

defining a plurality of acceptable statements of a combined code, wherein said plurality of acceptable statements comprises reactive code statements and non-reactive code statements such that a designer can specify computation with the non-reactive code statements and communication between different program modules with the reactive code statements;

splitting said combined code into a plurality of sets of code statements, a set of code statements comprising a plurality of code statements compilable independently, wherein the reactive code statements and non-reactive code statements are split at a user specification level, a compiler splitting level or an implementation level;

compiling said set of code statements; and merging said compiled set of code statements with one or more other sets of compiled code statements into a single executable program; and storing the code in a storage medium.

14. A computer-usable apparatus of claim 13, further comprising: using the processor for checking whether said set of code statements satisfies the semantics of a language of the combined language-compiler.

15. A computer-readable code embedded in a storage medium, wherein said computer readable code is manipulated by a combined language-compiler, said combined language-compiler configured to compile a plurality of code statements written using a plurality of computer languages, said combined language-compiler configured to execute a process, the process comprises:

using the processor for:

accepting a combined code comprising a plurality of code statements, wherein said plurality of code statements comprises reactive code statements and non-reactive code statements such that a designer can specify computation with the non-reactive code statements and communication between different program modules with the reactive code statements, wherein the reactive code statements and non-reactive code statements are split at a user specification level, a compiler splitting level or an implementation level;

splitting said combined code into a plurality of sets of code statements, each said set comprising a plurality of independently compilable code statements;

compiling at least one of said plurality of sets of code statements; and merging said at least one compiled code statement into a single executable program; and storing the code in the storage medium.

16. A computer-readable code of claim 15, further comprising: using the processor for checking whether said set of code statements satisfies the semantics of a language of the combined language-compiler.

17. In a combined language-compiler product for a computer system, a method of compiling hybrid source code using said combined language-compiler product, said method comprising:

parsing said plurality of code statements of said hybrid source code into a combined representation, wherein said act of parsing said plurality of hybrid code statements further includes of using at least two computer languages to write said plurality of hybrid source code statements;

splitting said combined representation into a plurality of sets of hybrid code statements, wherein the reactive code statements and non-reactive code statements are split at a user specification level, a compiler splitting level or an implementation level;

using at least two compilers to compile said plurality of sets of hybrid code statements, wherein at least one of said plurality of sets is compilable by at least one of said at least two compilers; and merging at least one of said plurality of sets of compiled statements into a single executable program.

18. The method of claim 17 wherein said act of splitting said hybrid code into said plurality of sets of code statements further comprises:

splitting said hybrid code at a specification level into two different trial codes, wherein said first trial code includes a first plurality of code modules including a first plurality of internal module computations, a first plurality of inter-module communications, and a first level of reactivity, and wherein said second trial code includes a second plurality of code modules including a second plurality of internal module computations, a second plurality of inter-module communications, and a second level of reactivity;

comparing said first trial code with said second trial code;

assessing the difference in compilation time and the difference in execution time between said two trial codes; and selecting an optimum trial code.

19. The method of claim 17 wherein said act of splitting said hybrid code further includes:

splitting said hybrid code at a compilation level into a plurality of reactive code statements and a plurality of non-reactive code statements.

20. The method of claim 17 wherein said act of splitting said hybrid code further includes splitting said hybrid code based at least in part upon an implementation level.

* * * * *